United States Patent
Sander et al.

(10) Patent No.: US 10,151,218 B2
(45) Date of Patent: Dec. 11, 2018

(54) GAS TURBINE ENGINE ATTACHMENT STRUCTURE AND METHOD THEREFOR

(71) Applicant: United Technologies Corporation, Hartford, CT (US)

(72) Inventors: David J. Sander, South Windsor, CT (US); Shelton O. Duelm, Wethersfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 476 days.

(21) Appl. No.: 14/768,857

(22) PCT Filed: Jan. 28, 2014

(86) PCT No.: PCT/US2014/013300
§ 371 (c)(1),
(2) Date: Aug. 19, 2015

(87) PCT Pub. No.: WO2014/130217
PCT Pub. Date: Aug. 28, 2014

(65) Prior Publication Data
US 2016/0003104 A1    Jan. 7, 2016

Related U.S. Application Data

(60) Provisional application No. 61/767,943, filed on Feb. 22, 2013.

(51) Int. Cl.
*F01D 25/26* (2006.01)
*F01D 9/04* (2006.01)
(Continued)

(52) U.S. Cl.
CPC ............. *F01D 25/26* (2013.01); *F01D 9/041* (2013.01); *F01D 25/162* (2013.01);
(Continued)

(58) Field of Classification Search
CPC ........ F01D 25/24; F01D 25/246; F01D 25/26; F01D 25/28; F01D 9/04; F01D 9/041;
(Continued)

(56) References Cited

U.S. PATENT DOCUMENTS

| 4,639,189 A | * | 1/1987 | Rosman | ................ F01D 9/041 415/115 |
| 5,222,360 A | | 6/1993 | Antuna et al. | |

(Continued)

FOREIGN PATENT DOCUMENTS

EP    2584152    4/2013

OTHER PUBLICATIONS

The International Search Report and Written Opinion for PCT Application No. PCT/US2014/013300, dated May 9, 2014.

(Continued)

*Primary Examiner* — Mark Laurenzi
*Assistant Examiner* — Xiaoting Hu
(74) *Attorney, Agent, or Firm* — Carlson, Gaskey & Olds, P.C.

(57) ABSTRACT

An attachment structure for a gas turbine engine includes a frame that has a first annular case. A second annular case extends around the frame. The first annular case and the second annular case include a plurality of interlocks. Each of the interlocks includes a first member mounted on one of the first annular case or the second annular case and a corresponding second member mounted on the other of the first annular case or the second case. The first member is received in the second member such that the plurality of interlocks restricts relative circumferential and axial movement between the first annular case and the second annular case.

9 Claims, 3 Drawing Sheets

(51) Int. Cl.
*F01D 25/24* (2006.01)
*F02C 7/20* (2006.01)
*F01D 25/16* (2006.01)

(52) U.S. Cl.
CPC .............. *F01D 25/246* (2013.01); *F02C 7/20* (2013.01); *F05D 2220/32* (2013.01); *F05D 2230/60* (2013.01); *F05D 2230/642* (2013.01); *F05D 2230/644* (2013.01); *F05D 2240/12* (2013.01); *F05D 2240/14* (2013.01); *Y02T 50/672* (2013.01); *Y02T 50/673* (2013.01)

(58) Field of Classification Search
CPC .. F01D 9/047; F05D 2240/12; F05D 2240/14; F05D 2260/30; F05D 2230/642; F05D 2230/644; Y02T 50/672; Y02T 50/673; F02C 7/20
USPC ......................................................... 415/136
See application file for complete search history.

(56) References Cited

U.S. PATENT DOCUMENTS

| | | | |
|---|---|---|---|
| 6,382,905 B1* | 5/2002 | Czachor | F01D 11/122 415/128 |
| 6,595,751 B1* | 7/2003 | Straub | F01D 5/025 416/170 R |
| 7,195,452 B2* | 3/2007 | Allan | F01D 9/02 248/675 |
| 7,594,405 B2 | 9/2009 | Somanath et al. | |
| 8,099,962 B2 | 1/2012 | Durocher et al. | |
| 8,181,467 B2 | 5/2012 | Kumar et al. | |
| 8,245,518 B2 | 8/2012 | Durocher et al. | |
| 9,551,238 B2* | 1/2017 | Chang | F01D 25/246 |
| 9,752,592 B2* | 9/2017 | Sippel | F04D 29/522 |
| 2002/0146316 A1* | 10/2002 | Bouyer | F01D 17/16 415/160 |
| 2002/0197153 A1* | 12/2002 | Rogers | F01D 9/04 415/137 |
| 2005/0058540 A1 | 3/2005 | Diakunchak | |
| 2008/0276621 A1 | 11/2008 | Somanath et al. | |
| 2010/0132371 A1 | 6/2010 | Durocher et al. | |
| 2010/0132373 A1 | 6/2010 | Durocher et al. | |
| 2010/0232875 A1* | 9/2010 | Cunningham | F01D 5/025 403/364 |
| 2010/0232941 A1* | 9/2010 | Smoke | F01D 25/246 415/173.1 |
| 2011/0274538 A1* | 11/2011 | Shi | F01D 11/08 415/200 |
| 2015/0330255 A1* | 11/2015 | Alarcon | F01D 25/24 415/182.1 |

OTHER PUBLICATIONS

International Preliminary Report on Patentability for PCT Application No. PCT/US2014/013300 dated Sep. 3, 2015.
European Search Report for European Patent Application No. 14754289 completed Sep. 19, 2016.

* cited by examiner

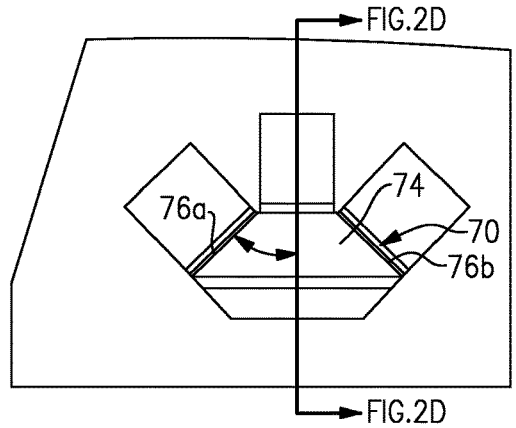
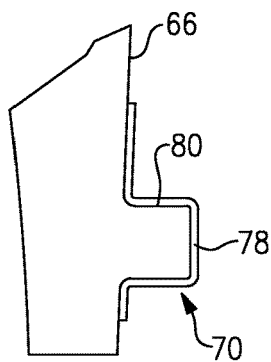
FIG.2C  FIG.2D
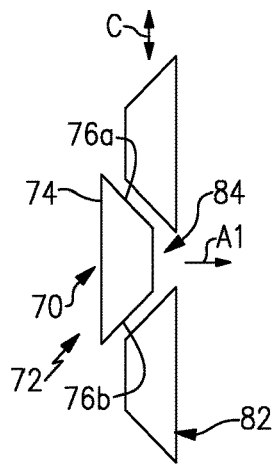
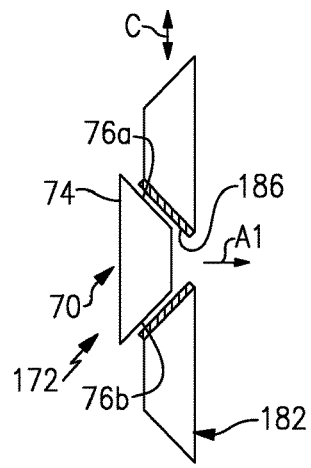
FIG.4  FIG.5
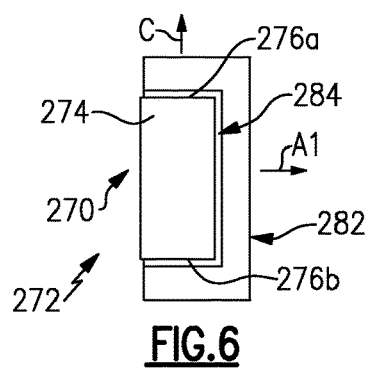
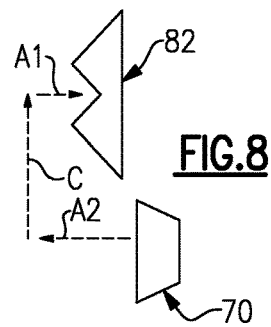
FIG.6  FIG.8

GAS TURBINE ENGINE ATTACHMENT STRUCTURE AND METHOD THEREFOR

BACKGROUND

A gas turbine engine typically includes a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor. Gas turbine engines installed on aircraft can include a fan section driven by the turbine section to provide thrust. Ground-based industrial gas turbine engines typically drive a generator through a shaft.

The turbine section includes turbine vanes that orient the gas flow in an axial direction. The vanes can be provided in an annular vane pack that is installed in the engine. The vane pack can be secured to an outer static engine structure such that aerodynamic loads on the vanes transfer to the static engine structure.

SUMMARY

An attachment structure for a gas turbine engine according to an exemplary aspect of the present disclosure includes a frame that has a first annular case and a second annular case which extends around the frame. The first annular case and the second annular case include a plurality of interlocks. Each of the plurality of interlocks include a first member mounted on one of the first annular case or the second annular case and a corresponding second member mounted on the other of the first annular case or the second annular case. The first member is received in the second member such that the plurality of interlocks restrict relative circumferential and axial movement between the first annular case and the second annular case.

In a further non-limiting embodiment of any of the foregoing examples, the plurality of interlocks permits relative radial movement between the first annular case and the second annular case.

In a further non-limiting embodiment of any of the foregoing examples, the first member is a wedge and the second member is a receiver having a complementary opening for the wedge.

In a further non-limiting embodiment of any of the foregoing examples, the wedge is tapered.

In a further non-limiting embodiment of any of the foregoing examples, the wedge includes opposed interface surfaces contacting the receiver, and the interface surfaces are oriented at an angle of 90°+/−25° to each other.

In a further non-limiting embodiment of any of the foregoing examples, the first member includes a ceramic material.

In a further non-limiting embodiment of any of the foregoing examples, the ceramic material includes a fiber-reinforced ceramic-matrix composite.

In a further non-limiting embodiment of any of the foregoing examples, the fiber-reinforced ceramic matrix composite is a multi-layer structure.

A further non-limiting embodiment of any of the foregoing examples, includes a wear resistance coating between the first member and the second member.

In a further non-limiting embodiment of any of the foregoing examples, frame includes an inner annular case spaced radially inwardly from the first annular case and a plurality of vanes extending between the inner case and the first annular case.

In a further non-limiting embodiment of any of the foregoing examples, there are a number N1 of the plurality of vanes and a number N2 of the plurality of interlocks, and a ratio of N1:N2 is 1:1.

A turbine engine according to an exemplary aspect of the present disclosure includes optionally, a fan, a compressor section, a combustor in fluid communication with the compressor section, and a turbine section in fluid communication with the combustor. The turbine section includes an attachment structure that has a frame, and a first annular case and a second annular case that extend around the frame. The first annular case and the second annular case include a plurality of interlocks. Each of the plurality of interlocks includes a first member mounted on one of the first annular case or the second annular case and a corresponding second member mounted on the other of the first annular case or the second annular case. The first member is received in the second member such that the plurality of interlocks restricts relative circumferential and axial movement between the first annular case and the second annular case.

A method of assembling an attachment structure of a gas turbine engine according to an exemplary aspect of the present disclosure includes providing a frame that has a first annular case and providing a second annular case which extends around the frame. The first annular case and the second annular case include a plurality of interlocks. Each of the plurality of interlocks include a first member mounted on one of the first annular case or the second annular case and a corresponding second member mounts on the other of the first annular case or the second annular case. The first member is inserted in the second member such that the plurality of interlocks restricts relative circumferential and axial movement between the first annular case and the second annular case.

In a further non-limiting embodiment of any of the foregoing examples, the plurality of interlocks permits relative radial movement between the first annular case and the second annular case.

A further non-limiting embodiment of any of the foregoing examples includes, prior to the insertion and with the first annular case and the second annular case coaxially oriented, moving the frame in a first axial direction with the first member and the second member circumferentially misaligned.

A further non-limiting embodiment of any of the foregoing examples includes rotating the frame such that the first member circumferentially aligns with the second member.

A further non-limiting embodiment of any of the foregoing examples includes moving the frame in a second axial direction opposite of the first axial direction to wedge the first member in the second member.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 2C illustrates a radial, top-down view of a portion from FIG. 2A.

FIG. 2D illustrates a sectioned view of FIG. 2C.

FIG. 4 illustrates an example interlock.

FIG. 5 illustrates another example interlock.

FIG. 6 illustrates another example interlock having a rectangular shape.

FIG. 8 illustrates an assembly of an interlock.

DETAILED DESCRIPTION

Figure 1:
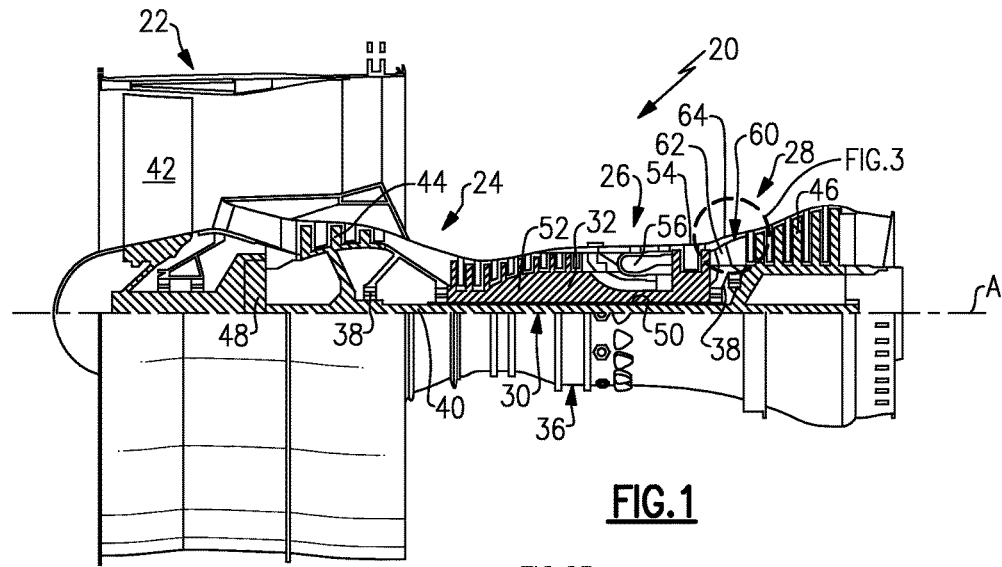
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it is to be understood that the examples herein are not limited to use with turbofans and can be applied to other types of turbine engines, including three-spool architectures and ground-based engines.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 is connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

The engine 20 is a high-bypass geared aircraft engine that has a bypass ratio that is greater than about six (6), with an example embodiment being greater than ten (10), the gear assembly of the fan drive gear system 48 is an epicyclic gear train, such as a planetary gear system or other gear system, with a gear reduction ratio of greater than about 2.3:1 and the first turbine 46 has a pressure ratio that is greater than about five (5). The first turbine 46 pressure ratio is pressure measured prior to inlet of first turbine 46 as related to the pressure at the outlet of the first turbine 46 prior to an exhaust nozzle. The first turbine 46 has a maximum rotor diameter and the fan 42 has a fan diameter such that a ratio of the maximum rotor diameter divided by the fan diameter is less than 0.6. It should be understood, however, that the above parameters are only exemplary.

A significant amount of thrust is provided by the bypass flow due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second.

The engine 20 also includes a mid-turbine frame structure 60 (hereafter "frame 60") having a plurality of airfoil vanes 62 (one shown). The frame 60 is located axially between the second turbine 54 and the first turbine 46. As can be appreciated, the vanes 62 orient core gas flow through the turbine section 28 in an axial direction. Aerodynamic loads on the vanes 62 are transferred to a static engine case 64 through a connection (not shown) between the frame 60 and the case 64.

In operation of the engine 20, the vanes 62 and the frame 60 are exposed to the relatively high temperatures of the core flowpath gas from the combustor 56, while the case 64, which is outside of the core flowpath, is substantially cooler. As a result of the different exposure temperatures of the frame 60 and the case 64, there can be a thermal growth mismatch that can cause thermally-induced stresses between the frame 60 and the case 64. The thermally-induced stresses can be further exacerbated if the frame 60 is made from composite materials such that there is a mismatch in the coefficients of thermal expansion between the composite materials and the material of the case 64, which is typically a metallic alloy. In this regard, as will be described in more detail below, a connection attachment structure, such as a wedge connection attachment, is provided between the frame 60 and the case 64 to restrict relative axial and circumferential movement between the frame 60 and the case 64, while permitting radial movement that can occur from the thermal mismatch.

Figure 2A:
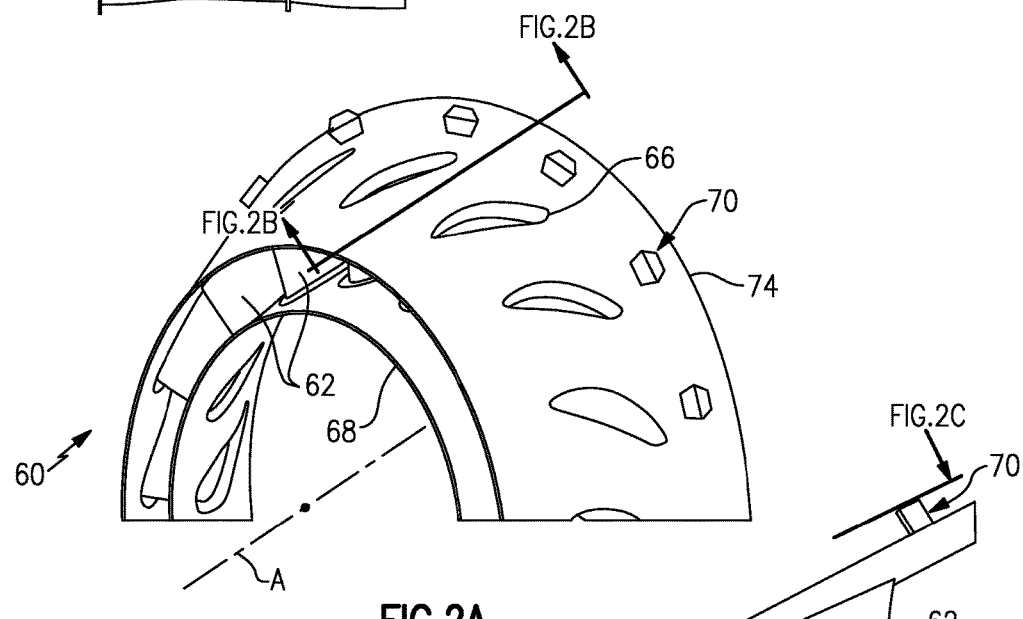
FIG. 2A illustrates an example mid-turbine frame structure for use in a gas turbine engine.
Figure 3:
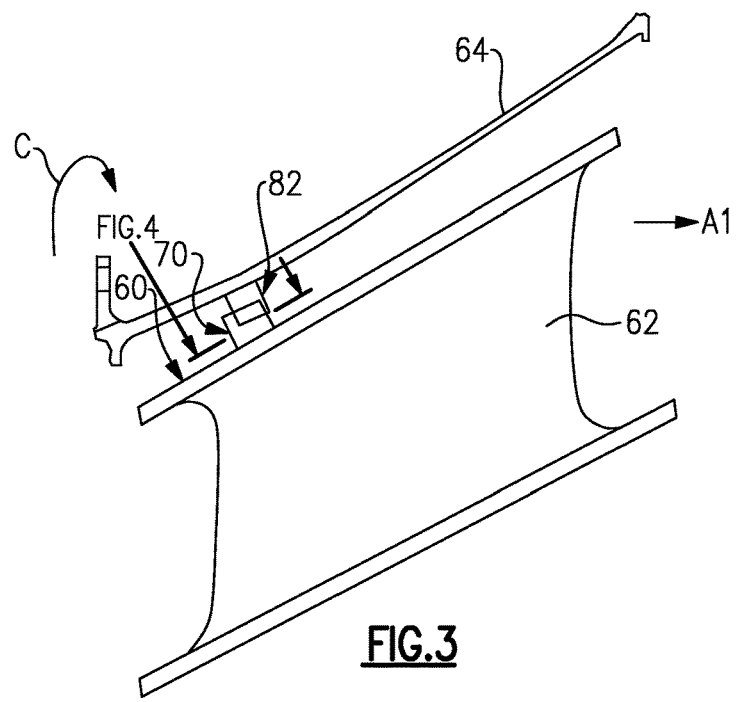
FIG. 3 illustrates a detailed view of a portion of FIG. 1.

Referring to FIG. 2A, the frame 60 includes an outer annular case 66, an inner annular case 68 and the vanes 62 that extend between the outer annular case 66 and the inner annular case 68. In this example, a plurality of first members 70 are mounted on the outer annular case 66, each with a corresponding second member 82 (FIG. 4) that is mounted on the case 64 (FIG. 3). The first members 70 and the second members 82 can be mounted by being integrally formed with the respective outer annular case 66 and case 64, or attached by bonding, for example. The first members 70 and the second members 82 constitute a plurality of interlocks 72 (FIG. 4) that secure the frame 60 and the case 64 together. In a further example, the engine 20 includes a number N1 of the interlocks 72 and the frame 60 includes a number N2 of the vanes 62 such that there is a ratio, N1:N2, of 1:1, for facilitating load transfer from each of the vanes 62 to the case 64. In other examples, other ratios could be used.

Figure 2B:
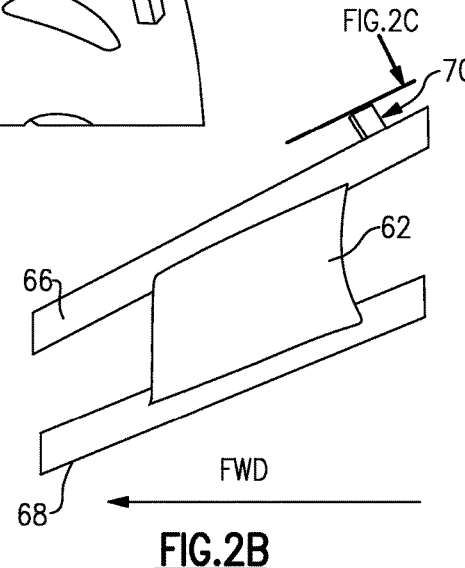
FIG. 2B illustrates a sectioned view from FIG. 2A.

Referring also to FIGS. 2B, 2C, and 2D, the first member 70 in this example is a wedge 74. As shown in the radial, top-down view of FIG. 2C, the wedge 74 in this example generally has a truncated, tapered shape with opposed interface surfaces 76a/76b that serve as bearing surfaces. In one example, the interface surfaces 76A/76B are oriented such that each forms a half angle a with a central axis through the wedge 74. In this example, the interface surfaces 76a/76b form approximately 45° half angles a with the central axis such that the interface surfaces 76a/76b are oriented at 90°+/−25° relative to each other.

The first member 70 can be made of any of a variety of different materials, such as metallic materials, ceramic materials and composite materials, including ceramic, polymeric or metallic composites. In one example, as shown in FIG. 2D, the first member 70 includes a multi-layer fiber-reinforced ceramic matrix composite 78. The multi-layer fiber-reinforced ceramic matrix composite 78 is an overlay around a core structure 80 of the first member 70. For instance, the core structure 80 can be a ceramic matrix composite material, stacked fiber-reinforced plies, a solid material with resin that completely fills any spaces or a combination of resin material and chopped fibers to fill the space. In a further example, the core structure 80 has the same composition as the ceramic matrix of the multi-layer fiber-reinforced ceramic matrix composite 78. The loading on the first members 70 facilitates the use of composites. For example, in the illustrated design, the first members 70 are in a shear stress state, rather than bending stress state. The multi-layer fiber-reinforced composite can be designed to handle the expected shear stress, whereas a bending stress state would drive inter-laminar tension and potential delamination of the layers.

FIG. 3 shows the frame 60 in a fully installed position in the case 64. As shown, the case 64 includes the second member 82, which is also shown in FIG. 4. Alternatively, although the examples show the first members 70 mounted on the outer annular case 66 of the frame 60 and the second members 82 mounted on the case 64, the design can be switched such that the first members 70 are mounted on the case 64 and the second members 82 are mounted on the outer annular case 66 of the frame 60.

The second member 82 is a receiver that has a complimentary opening 84 for the wedge 74. The complementary opening 84 has a triangular shape to accommodate the truncated, tapered shape of the wedge 74. When installed, the first member 70 of the frame 60 is received into the opening 84 of the second member 82 such that the interlock 72 restricts relative movement between the frame 60 and the case 64 in a circumferential direction C and an axial direction A1 (parallel to engine central axis A). In this example, the first member 70 of the frame 60 is wedged into the opening 84 of the second member 82. The interface surfaces 76a/76b contact the second member 82. Thus, aerodynamic loads on the vanes 62 are transferred through the interface surfaces 76a/76b of the first members 70 and into the second members 82, and ultimately into the case 64. The size of the first members 70 and interface surfaces 76a/76b can be tailored according to expected aerodynamic loads.

FIG. 5 shows another example interlock 172. In this disclosure, like reference numbers designate like elements where appropriate and reference numerals with the addition of one-hundred or multiples thereof designate modified elements that are understood to incorporate the same features and benefits of the corresponding elements. In this example, the wedge 74 of the first member 70 is received into a second member 182. There is a wear resistance coating 186 between the first member 70 and the second member 182. In this example, the wear resistance coating 186 is applied on the second member 182, although it is to be understood that the wear resistance coating 186 could alternatively be on the interface surfaces 76a/76b of the first member 70. In one example, the wear resistance coating 186 is harder than the material of the second member 182, and can also be harder than the material of the first member 70. For example, the wear resistance coating is a metal or metallic alloy, polymer, ceramic, composite or a combination thereof.

FIG. 6 shows another example interlock 272 having a different shape than the interlock 72 or 172. In this example, the first member 270 has a generally rectangular cross-section rather than the tapered profile of the wedge 74. Likewise, the complimentary opening 284 of the second member 282 has a rectangular shape to receive the wedge 274. As can be appreciated, other complimentary shapes for the first member 270 and the opening 284 of the second member 282 can alternatively be used to restrict relative movement in the axial direction A1 and the circumferential direction C.

Figure 7:
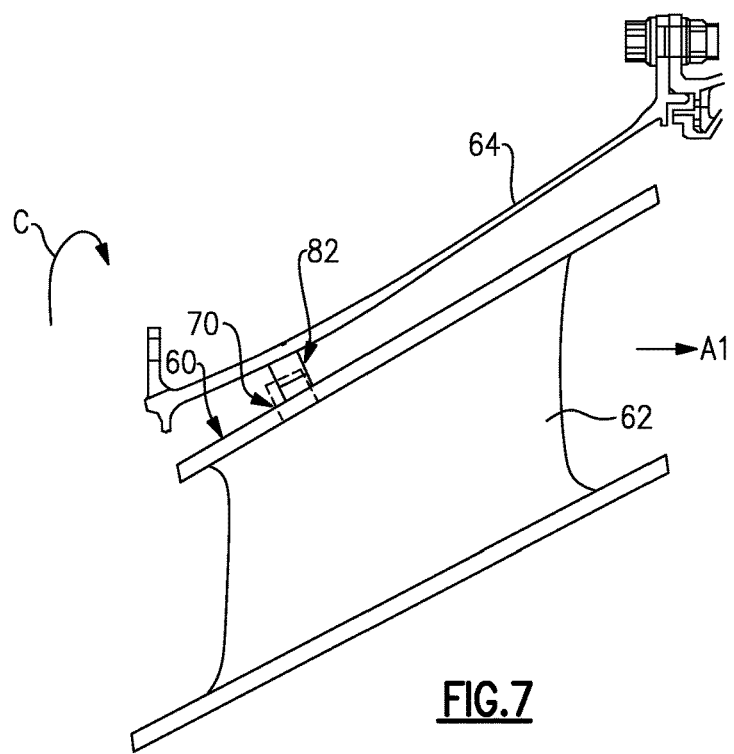
FIG. 7 illustrates a partially assembled view.

Referring also to FIGS. 7 and 8, with continued reference to FIG. 3, the frame 60 can be assembled using a clocking technique. For example, as shown in FIG. 8, the first members 70 are initially circumferentially misaligned with the second members 82. The frame 60 is then moved axially along direction A2 such that the first member 70 moves axially past the second member 82 (as also shown in FIG. 7). The frame 60 is then rotated circumferentially along circumferential direction C such that the first member 70 circumferentially aligns with the second member 82. The frame 60 is then moved along axial direction A1 such that the first member 70 is received into the second member 82, as shown in FIGS. 3 and 4 (and in phantom in FIG. 7).

The receiving, and in some instances wedging, between the first member 70 and the second member 82 restricts relative movement in the axial direction A1 and the circumferential direction C. However, there is no rigid interlocking in a radial direction and relative radial movement there between, such as from thermal mismatch, is unrestricted. Additionally, the interlocks 72 are relatively compact and "low-profile," which allows packaging between the outer annular case 66 and the case 64. Also, the configuration of the interlocks 72 does not require the use a wrench for installation/removal and thus a wrench clearance is not needed between the outer annular case 66 and the case 64. Furthermore, the installation of the frame 60 into the case 64 can be conducted as an initial or original manufacture of the engine 20, or as a step in a repair or maintenance procedure on the engine 20.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An attachment structure for a gas turbine engine, comprising:
    a frame including a first annular case, an inner annular case spaced radially inwardly from the first annular case, and a plurality of vanes extending between the inner case and the first annular case; and
    a second annular case extending around the frame, the first annular case and the second annular case including a plurality of interlocks, each of the plurality of interlocks including a first member mounted on one of the first annular case or the second annular case and a corresponding second member mounted on the other of the first annular case or the second annular case, the first member being received in the second member such that the plurality of interlocks restrict relative circumferential and axial movement between the first annular case and the second annular case, wherein the first member is a wedge that is tapered in an axial direction and the second member is a receiver having a complementary opening for the wedge.

2. The attachment structure as recited in claim 1, wherein the plurality of interlocks permits relative radial movement between the first annular case and the second annular case.

3. The attachment structure as recited in claim 1, wherein the wedge includes opposed interface surfaces contacting the receiver, and the interface surfaces are oriented at an angle of 90° +/−25° to each other.

4. The attachment structure as recited in claim 1, wherein the first member includes a ceramic material.

5. The attachment structure as recited in claim 4, wherein the ceramic material includes a fiber-reinforced ceramic-matrix composite.

6. The attachment structure as recited in claim 5, wherein the fiber-reinforced ceramic matrix composite is a multi-layer structure.

7. The attachment structure as recited in claim 1, further comprising a wear resistance coating between the first member and the second member.

8. The attachment structure as recited in claim 1, wherein there are a number $N_1$ of the plurality of vanes and a number $N_2$ of the plurality of interlocks, and a ratio of $N_1:N_2$ is 1:1.

9. A turbine engine comprising:
    a compressor section;
    a combustor in fluid communication with the compressor section; and
    a turbine section in fluid communication with the combustor, the turbine section including an attachment structure comprising:
        a frame including a first annular case, an inner annular case spaced radially inwardly from the first annular case, and a plurality of vanes extending between the inner case and the first annular case, and
        a second annular case extending around the frame, the first annular case and the second annular case including a plurality of interlocks, each of the plurality of interlocks including a first member mounted on one of the first annular case or the second annular case and a corresponding second member mounted on the other of the first annular case or the second annular case, the first member being received in the second member such that the plurality of interlocks restrict relative circumferential and axial movement between the first annular case and the second annular case, wherein the first member is a wedge that is tapered in an axial direction and the second member is a receiver having a complementary opening for the wedge.

* * * * *